United States Patent Office  2,847,462
Patented Aug. 12, 1958

2,847,462

METHOD OF FRACTIONATING MIXED ISOMERS OF TRICHLOROBENZOIC ACID

George M. Sieger, Pearl River, N. Y., assignor to Heyden Newport Chemical Corporation, a corporation of Delaware No Drawing. Application March 2, 1956
Serial No. 568,974

5 Claims. (Cl. 260—525)

The present invention relates to a novel method of fractionating mixed isomers of trichlorobenzoic acid. More particularly, the present invention relates to a novel method of fractionating trichlorobenzoic acid containing the 2,3,6-isomer plus at least one other isomer to obtain a fraction relatively richer in 2,3,6-trichlorobenzoic acid and a second or residual fraction relatively richer in such other isomer. While the present invention is primarily concerned with and will be more particularly described in connection with the production of trichlorobenzoic acid containing a high percentage of the 2,3,6-isomer, its principles are applicable to separating the 2,3,6-isomer from a mixture of isomers to obtain a purer isomer material relatively free of the 2,3,6-isomer.

In the production of trichlorobenzoic acid and particularly in the commercial production of this acid, the product obtained is a mixture of various isomers of this acid. The principle isomer or isomers present as well as the proportions of the isomers depend upon a number of factors. In the production of 2,3,6-trichlorobenzoic acid, which compound as well as its salts is a highly desirable herbicide, the product obtained contains at least one and usually all of the isomers other than the 2,3,6-isomer. In the production of 2,3,6-trichlorobenzoic acid, the conditions of its production are usually so selected that the product will contain a fairly high percentage by weight of 2,3,6-trichlorobenzoic acid based on the total weight of trichlorobenzoic acid. Generally, but not necessarily, the amount of 2,4,5-trichlorobenzoic acid will constitute the largest amount of any single isomer, other than the 2,3,6-isomer, present in the mixture of isomers. The other isomers which may be and usually are present include all or most of the following:

2,3,4-trichlorobenzoic acid
2,3,5-trichlorobenzoic acid
2,4,6-trichlorobenzoic acid
3,4,5-trichlorobenzoic acid The expression "relatively richer" is used herein in reference to the isomer content of a fraction of the trichlorobenzoic acid starting material to indicate that the fraction contains a higher percentage by weight of this isomer or isomers than the relatively crude starting material.

Broadly speaking, I have discovered that 2,3,6-trichlorobenzoic acid containing at least one other isomer of this acid can be fractionated by treating the starting material with a solvent which more readily dissolves the 2,3,6-isomer than the other isomer or isomers. The mixture of isomers can be treated with this solvent to form a mixture including a solution of trichlorobenzoic acid relatively richer in 2,3,6-isomer and undissolved trichlorobenzoic acid which is relatively richer in isomers other than 2,3,6-trichlorobenzoic acid. More particularly, treatment may be carried out by dissolving all of the trichlorobenzoic acid starting material in the selective solvent, preferably heated to increase its solvent power, and then cooling the solution to precipitate a fraction of the trichlorobenzoic acid relatively richer in isomer other than the 2,3,6-isomer. Alternatively, the starting material may be mixed with an amount of selective solvent that is insufficient to dissolve all of the trichlorobenzoic acid. The smaller amount of solvent will preferentially dissolve the 2,3,6-trichlorobenzoic acid to form a mixture comprising a solution of trichlorobenzoic acid relatively richer in the 2,3,6-isomer and an undissolved trichlorobenzoic acid fraction relatively richer in the other isomer of this acid. Also the starting material can be dissolved in the selective solvent and the resulting solution concentrated by evaporation to precipitate a trichlorobenzoic acid fraction relatively richer in the other isomer. Regardless of the particular procedure followed, the solution of trichlorobenzoic acid can be separated from the undissolved portion of the starting material. Thereafter the upgraded 2,3,6-trichlorobenzoic acid can be recovered from the solution, or the solution may be used either with or without dilution as a herbicide.

The highly preferred selective solvents are butyl acetate, amyl acetate or mixtures thereof. While these solvents are the most efficient, other solvents may be used including the lower alkyl acetates in which the alkyl group contains 1–3 carbon atoms.

The following examples illustrate the present invention and in these examples as well as throughout the specification and accompanying claims, all percentages are by weight and the percentage of the isomer content is based on the weight of trichlorobenzoic acid present.

*Example 1*

The starting material was crude trichlorobenzoic acid containing about 60% of the 2,3,6-isomer plus a fairly large amount of the 2,4,5-isomer and a somewhat smaller amount of 2,3,5-isomer. In addition, the starting material contained at least small amounts of substantially all the isomers other than those specifically named. Fifty grams of this starting material was mixed with 50 grams of amyl acetate and warmed with stirring to dissolve all of the starting material. The resulting clear, yellowish solution was cooled and held at 0–5° C. overnight to precipitate part of the trichlorobenzoic acid. The mixture was filtered to separate the crystalline trichlorobenzoic acid and then air-dried. The separated material weighed 17.5 grams and this insoluble fraction contained about 54% of 2,4,5-trichlorobenzoic acid and 23% of 2,3,6-trichlorobenzoic acid.

The filtrate or solution from which the precipitated trichlorobenzoic acid had been separated was mixed with 700 ml. of water. The mixture was then subjected to vacuum distillation to remove most of the amyl acetate. When the volume had been reduced to about 500 ml., distillation was interrupted and the concentrated mixture was chilled with stirring to precipitate trichlorobenzoic acid. The precipitated acid was separated by filtration and then dried. This first fraction weighed 29 grams. A second crop was obtained by further concentrating the filtrate and chilling. In this manner an additional 2.5 grams was obtained. The two crops were combined making a total of 31.5 grams containing 81% of the 2,3,6-isomer.

*Example 2*

Fifty grams of the starting material used in Example 1 was dissolved in 50 grams of butyl acetate at 70–80° C. The solution was chilled and held at 0–5° C. to precipitate an insoluble fraction of trichlorobenzoic acid. The precipitated material was separated by filtration. After drying, the separated material weighed 10 grams and contained 57% 2, 4, 5-isomer and 16% 2,3,6-isomer. The filtrate was mixed with water and concentrated in the same manner as described in Example 1. The isolated material amounted to 33.7 grams and contained 78% 2,3,6-isomer.

In the foregoing examples a mixture of trichlorobenzoic acid isomers containing a high percentage of the 2,3,6-isomer has been fractionated to obtain upgraded 2,3,6-trichlorobenzoic acid. However, mixed isomers containing a lower percentage of 2,3,6-isomer could be fractionated in this manner. In addition mixed isomers containing a small amount of 2,3,6-trichlorobenzoic acid could be treated in accordance with the principles of the present invention to obtain trichlorobenzoic acid substantially free of the 2,3,6-isomer.

I claim:

1. In the process of fractionating a mixture of isomers of trichlorobenzoic acid starting material containing the 2,3,6-isomer and another isomer, the improvement comprising treating the mixture of isomers with an alkyl acetate in which the alkyl group contains 1–5 carbon atoms and forming a mixture of an alkyl acetate solution of trichlorobenzoic acid containing a higher percentage by weight of the 2,3,6-isomer than the trichlorobenzoic acid starting material and an undissolved portion containing a lower percentage by weight than the trichlorobenzoic acid starting material, and separating the alkyl acetate solution from the undissolved trichlorobenzoic acid.

2. In the process of fractionating a mixture of isomers of trichlorobenzoic acid containing the 2,3,6-isomer, the 2,4,5-isomer, and another isomer, the improvement comprising treating said mixture of isomers with amyl acetate and forming a mixture comprising an amyl acetate solution of trichlorobenzoic acid relatively richer in the 2,3,6-isomer than the trichlorobenzoic acid starting material and an undissolved portion relatively richer in the 2,4,5-isomer and said other isomer than the trichlorobenzoic acid starting material, and separating the undissolved trichlorobenzoic acid from the amyl acetate solution.

3. In the process of fractionating a mixture of isomers of trichlorobenzoic acid containing the 2,3,6-isomer, the 2,4,5-isomer, and another isomer, the improvement comprising treating said mixture of isomers with butyl acetate and forming a mixture comprising a butyl acetate solution of trichlorobenzoic acid relatively richer in the 2,3,6-isomer than the trichlorobenzoic acid starting material and an undissolved portion relatively richer in the 2,4,5-isomer and said other isomer than the trichlorobenzoic acid starting material, and separating the butyl acetate solution from the undissolved trichlorobenzoic acid.

4. In the process of fractionating a mixture of trichlorobenzoic acid isomers including the 2,3,6-isomer and the 2,4,5-isomer, the improvement comprising treating such mixed isomers with amyl acetate and forming a mixture including an amyl acetate solution of trichlorobenzoic acid relatively richer in 2,3,6-isomer and undissolved trichlorobenzoic acid relatively richer in 2,4,5-isomer, and separating the amyl acetate solution from the undissolved trichlorobenzoic acid.

5. In the process of fractionating a mixture of trichlorobenzoic acid isomers including the 2,3,6-isomer and the 2,4,5-isomer, the improvement comprising treating such mixed isomers with butyl acetate and forming a mixture including a butyl acetate solution of trichlorobenzoic acid relatively richer in 2,3,6-isomer and undissolved trichlorobenzoic acid relatively richer in 2,4,5-isomer and separating the butyl acetate solution from the undissolved trichlorobenzoic acid.

References Cited in the file of this patent

McElvain: Characterization of Organic Compounds, p. 47 (1945).